US007990906B2

(12) United States Patent
Viorel et al.

(10) Patent No.: US 7,990,906 B2
(45) Date of Patent: Aug. 2, 2011

(54) FRAME STRUCTURE FOR A RELAY STATION OPERATING IN MOBILE NETWORKS

(75) Inventors: Dorin Viorel, Calgary (CA); Fraser Cameron, Calgary (CA); Ken Wong, Calgary (CA); Tamio Saito, Kanagawa (JP); Masato Okuda, Saitama (JP)

(73) Assignee: Fujitsu Semiconductor Limited, Yokohama (JP)

( * ) Notice: Subject to any disclaimer, the term of this patent is extended or adjusted under 35 U.S.C. 154(b) by 892 days.

(21) Appl. No.: 11/927,035

(22) Filed: Oct. 29, 2007

(65) Prior Publication Data

US 2008/0107062 A1 May 8, 2008

Related U.S. Application Data

(60) Provisional application No. 60/864,183, filed on Nov. 3, 2006.

(51) Int. Cl.
*H04B 7/14* (2006.01)
(52) U.S. Cl. ......................................... 370/315; 370/329
(58) Field of Classification Search ................... 370/315, 370/328, 329, 337, 344, 347
See application file for complete search history.

(56) References Cited

U.S. PATENT DOCUMENTS

| 7,796,546 | B2 * | 9/2010 | Lee et al. ....................... 370/315 |
| 2007/0082629 | A1 * | 4/2007 | Shimizu et al. ............. 455/127.2 |
| 2007/0087691 | A1 * | 4/2007 | Lee et al. ...................... 455/13.2 |
| 2007/0223496 | A1 * | 9/2007 | Izumi ............................ 370/397 |

FOREIGN PATENT DOCUMENTS

| WO | WO 2005/067173 | 7/2005 |
| WO | WO 2007/053954 | 5/2007 |

OTHER PUBLICATIONS

European Search Report dated Mar. 14, 2011 for corresponding European Patent Application No. 07119936.8.
Fang-Ching Ren, et al., "Recommendations on PMP Mode Compatible TDD Frame Structure", IEEE 802.16 Session #39, Taipei, Taiwan, submitted Nov. 11, 2005.
Xiaobing Leng, et al., "A Frame Structure for Mobile Multi-Hop Relay with Different Carrier Frequencies", IEEE 802.16 Session #40, Vancouver, Canada, submitted Nov. 11, 2005.
Su Chang Chae, et al., "Hybrid Relay Structure within a Single Frame", IEEE 802.16 Broadband Wireless Access Working Group, submitted Nov. 14, 2006.
Dale Branlund, et al., "Frame Structures for Multihop Relay System", IEEE 802.16 Broadband Wireless Access Working Group, submitted Nov. 7, 2006.
R. Peterson, et al., "Proposal for a Frame Structure for IEEE 802.16j", IEEE 802.16j Mobile Multihop Relay Task Group, Nov. 7, 2006.

* cited by examiner

*Primary Examiner* — Brian D Nguyen
(74) *Attorney, Agent, or Firm* — Staas & Halsey LLP

(57) ABSTRACT

A frame structure for a relay station operating in an OFDMA network includes a downlink sub-frame having a first allocated time zone dedicated for transmission between a base station in the network and the relay station, a second allocated time zone dedicated for transmission between the base station and a mobile station in the network, and a third allocated time zone dedicated for transmission between the relay station and the mobile station; and an uplink sub-frame having a first allocated time zone dedicated for transmission between the mobile station and the relay station, a second allocated time zone dedicated for transmission between the mobile station and the base station, and a third allocated time zone dedicated for transmission between the relay station and the base station.

10 Claims, 4 Drawing Sheets

FRAME STRUCTURE FOR A RELAY STATION OPERATING IN MOBILE NETWORKS

CROSS-REFERENCE TO RELATED APPLICATIONS

The present application claims priority to provisional application titled "Frame Structure for Relay Stations Operating in Mobile WiMAX Networks", Ser. No. 60/864,183, filed Nov. 3, 2006, inventors Dorin Viorel, Fraser Cameron, Ken Wong, Tamio Saito, and Masato Okuda, and which is incorporated herein by reference.

BACKGROUND OF THE INVENTION

DESCRIPTION OF THE RELATED ART

Wireless communication networks have become increasingly popular and generally include a base station that provides service to a cell area located around the base station. Mobile stations (such as cell phones, etc.) are able to communicate with the base station when they are within the service area of the base station.

However, in wireless communication networks, due to such effects as shadowing arising from blockage by buildings and other obstructions between transmission/reception antennas, there exist dead zones in which communication with the base station is not possible, despite being within the service area. To combat this problem, in an Orthogonal Frequency Division Multiple Access (OFDMA) network, such as, for example, a network based on the Institute of Electrical and Electronics Engineers (IEEE) 802.16 standard, relay stations are employed for providing enhanced transmission capabilities by acting as intermediaries between mobile stations operating in the network and the base station. In this manner, a mobile station that is incapable of connecting directly to a base station within its cell service area may still connect indirectly to the base station by first communicating with a relay station that does have a direct link, or possibly an indirect link, to the base station.

Each relay station is provided with a hardware architecture for transmitting and receiving signals to and from other stations within the network. To this end, each relay station is generally provided with a double transceiver for covering both a link between the relay station and a base station and a link between the relay station and a mobile station.

SUMMARY OF THE INVENTION

Various embodiments of the present invention provide a frame structure which includes (a) a downlink sub-frame having a first allocated time zone dedicated for transmission between the base station and relay station, a second allocated time zone dedicated for transmission between the base station and the one or more mobile stations, and a third allocated time zone dedicated for transmission between the relay station and the one or more mobile stations; and (b) an uplink sub-frame having a first allocated time zone dedicated for transmission between the one or more mobile stations and the relay station, a second allocated time zone dedicated for transmission between the one or more mobile stations and the base station, and a third allocated time zone dedicated for transmission between the relay station and the base station.

Various embodiments of the present invention provide a method which includes (a) dividing a downlink sub-frame of the time frame into a first allocated time zone dedicated for transmission between the base station and relay station, a second allocated time zone dedicated for transmission between the base station and the one or more mobile stations, and a third allocated time zone dedicated for transmission between the relay station and the one or more mobile stations; and (b) dividing an uplink sub-frame of the time frame into a first allocated time zone dedicated for transmission between the one or more mobile stations and the relay station, a second allocated time zone dedicated for transmission between the one or more mobile stations and the base station, and a third allocated time zone dedicated for transmission between the relay station and the base station.

The above embodiments of the present invention are simply examples, and all embodiments of the present invention are not limited to these examples.

Additional advantages of the invention will be set forth in part in the description which follows, and, in part, will be obvious from the description, or may be learned by practice of the invention.

BRIEF DESCRIPTION OF THE DRAWINGS

These and other objects and advantages of the invention will become apparent and more readily appreciated from the following description of the preferred embodiments, taken in conjunction with the accompanying drawings of which.

DETAILED DESCRIPTION OF THE PREFERRED EMBODIMENTS

Figure 1:
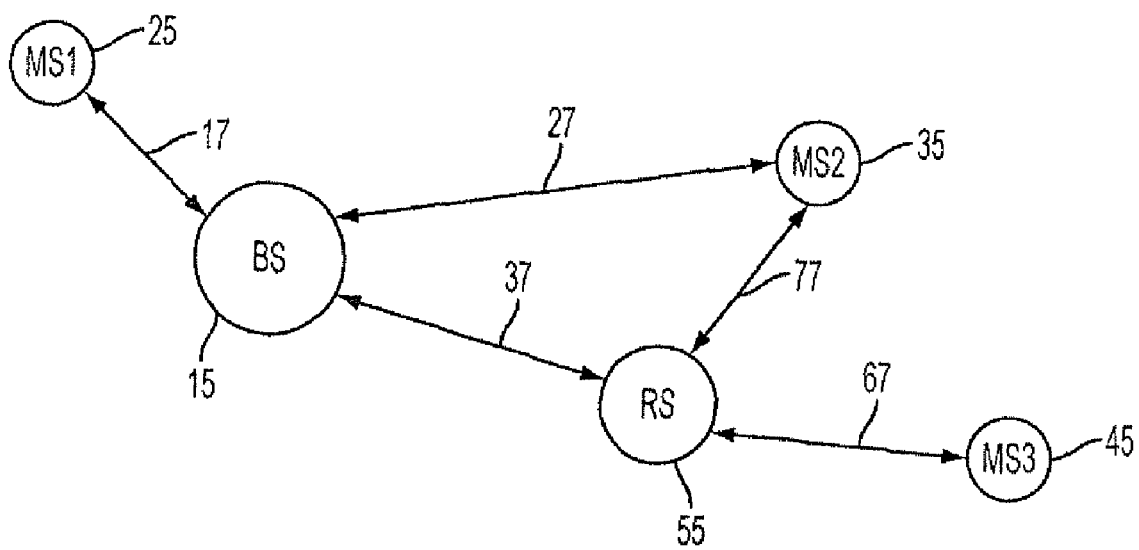
FIG. 1 is an illustration of an example of an intra-cell topology involving a relay station operating in an OFDMA network under the 802.16 standard.

Reference will now be made in detail to the present preferred embodiments of the present invention, examples of which are illustrated in the accompanying drawings, wherein like reference numerals refer to like elements throughout.

FIG. 1 is an illustrative example of an intra-cell topology involving a relay station operating in an OFDMA network. The network cell includes a base station (BS) 15, a relay station (RS) 55, a first mobile station (MS1) 25, a second mobile station (MS2) 35, and a third mobile station (MS3) 45. In this example, mobile station 25 is within range of base station 15, and, therefore, can communicate directly with base station 15 through the MS1-BS link 17. Mobile station 35 is within range of base station 15 and relay station 55 and, therefore, can communicate directly with base station 15 through the MS2-BS link 27, or, in the alternative, can communicate with base station 15 indirectly through relay station 55, using the MS2-RS link 77 and the RS-BS link 37. Mobile station 45 is out of range of base station 15 and, therefore, can only communicate with base station 15 indirectly through relay station 55, using MS3-RS link 67 and RS-BS link 37. In order to properly service both link 37 and link 67, relay station 55 would require two transceivers, thereby subjecting relay station 55 to significant interference between the concurrent transceiver operations within the same time frame.

Various embodiments of the present invention provide a frame structure for a relay station operating in a mobile Orthogonal Frequency Division Multiple Access (OFDMA) network having a base station and one or more mobile stations. Various embodiments of the present invention provide a frame structure which includes a downlink sub-frame having three allocated time zones and an uplink sub-frame having three allocated time zones. Various embodiments of the present invention provide a downlink sub-frame having a first allocated time zone dedicated for transmission between the base station and relay station, a second allocated time zone dedicated for transmission between the base station and the one or more mobile stations, and a third allocated time zone dedicated for transmission between the relay station and the one or more mobile stations. Various embodiments of the present invention provide an uplink sub-frame having a first allocated time zone dedicated for transmission between the one or more mobile stations and the relay station, a second allocated time zone dedicated for transmission between the one or more mobile stations and the base station, and a third allocated time zone dedicated for transmission between the relay station and the base station. In this manner, interference between stations in the network can be greatly reduced and a relay station can be provided with a single, switched-transceiver architecture.

FIG. 1 is only an illustrative example of an intra-cell topology involving a single relay station operating in an OFDMA network. The various embodiments of the present invention are not limited to an OFDMA network including only a single base station, a single relay station, and three mobile stations as illustrated in FIG. 1, but may include any wireless communication network supporting any number of base stations, relay stations, and mobile stations.

Figure 2:
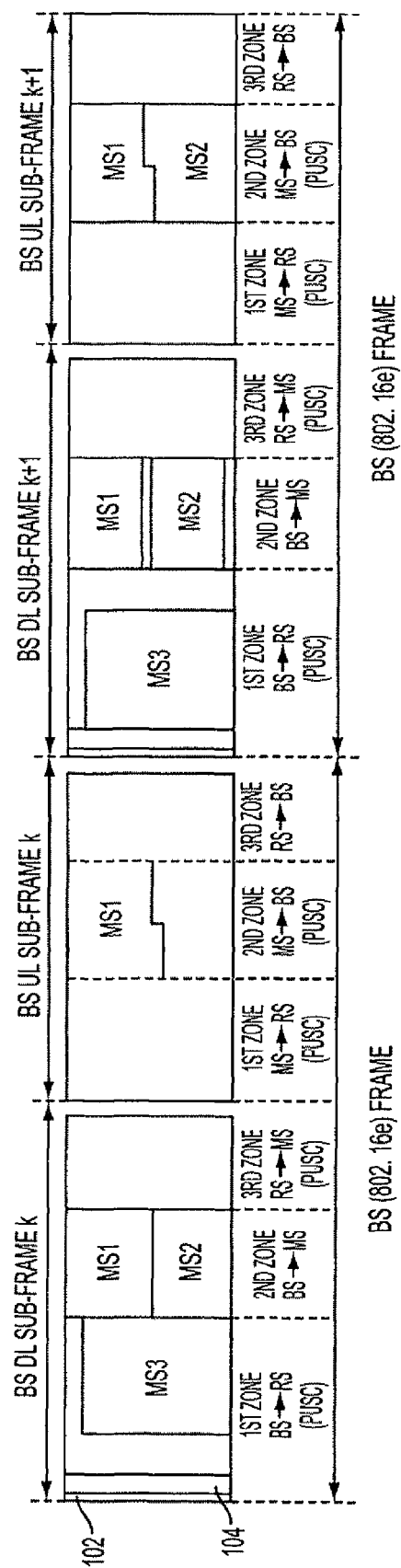
FIG. 2 is an illustration of a frame structure for a base station operating in a mobile Orthogonal Frequency Division Multiple Access (OFDMA) network having a base station and one or more mobile stations, according to an embodiment of the present invention.
Figure 3:
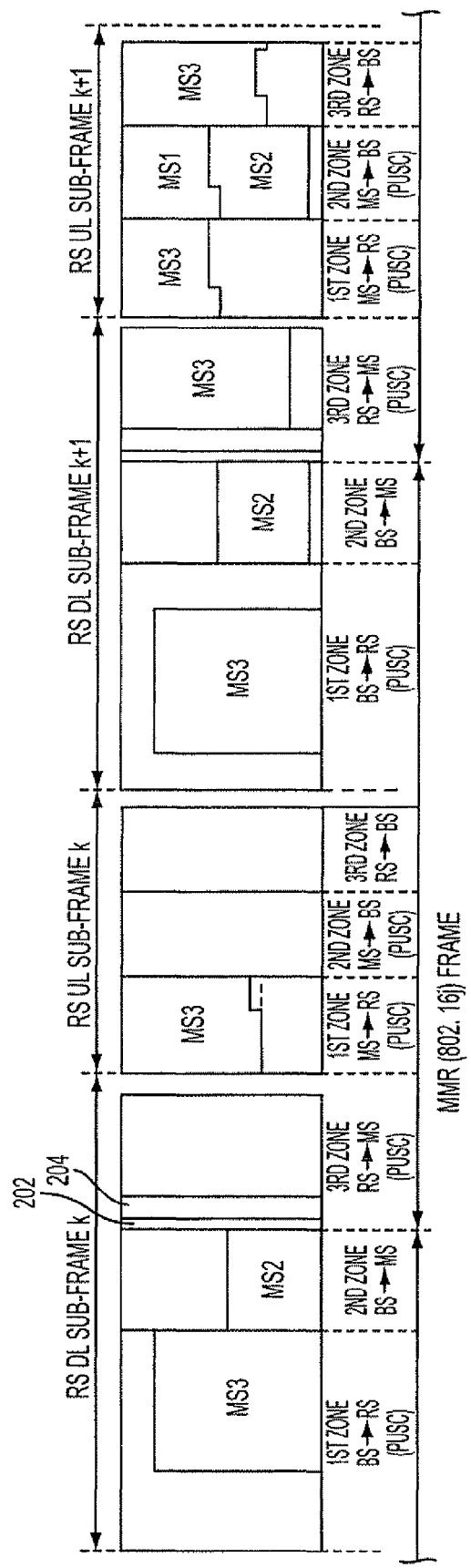
FIG. 3 is an illustration of a frame structure for a relay station operating in a mobile Orthogonal Frequency Division Multiple Access (OFDMA) network having a base station and one or more mobile stations, according to an embodiment of the present invention.

FIGS. 2 and 3 illustrate a frame structure and traffic activity for the base station 15 and the relay station 55, respectively, operating in the mobile OFDMA network illustrated in FIG. 1, according to an embodiment of the present invention. Each frame includes a downlink sub-frame and an uplink sub-frame. In order to simplify the illustration, only downlink control bursts are shown. Each downlink sub-frame is divided into a first allocated time zone dedicated for transmission bursts between base station 15 and relay station 55, a second allocated time zone dedicated for transmission bursts between base station 15 and mobile stations 25, 35, and 45, and a third allocated time zone dedicated for transmission bursts between relay station 55 and mobile stations 25, 35, and 45. Each uplink sub-frame is divided into a first allocated time zone dedicated for transmission bursts between one or more mobile stations 25, 35, and 45 and relay station 55, a second allocated time zone dedicated for transmission bursts between one or more mobile stations 25, 35, and 45 and base station 15, and a third allocated time zone dedicated for transmission bursts between relay station 55 and base station 15.

As shown in FIGS. 2 and 3, downlink bursts from base station 15 dedicated to mobile station 45, through relay station 55, will be received in frame k by relay station 55 and relayed in frame k+1 to mobile station 45. With the assumption that no downlink bursts have been scheduled for mobile station 45, through relay station 55, in the frame k−1 (not shown), relay station 55 will transmit no downlink bursts to mobile station 45 in frame k. This represents a frame structure with a frame relevance 1 implementation. The various embodiments of the present invention are not limited to a frame structure with a frame relevance 1 implementation, but may include a frame structure with any frame relevance implementation.

The downlink bursts from base station 15 dedicated to mobile station 45 in the first allocated time zone of the base station downlink sub-frame are received in the first allocated time zone of the relay station downlink sub-frame. Therefore, since no relay station activity is performed in the second allocated time zone of the relay station downlink sub-frame, this time zone may act as a time buffer between the first allocated time zone of the relay station downlink sub-frame and third allocated time zone of the relay station downlink sub-frame. In this manner, any burst received by the relay station 55 from the base station 15 can be transmitted to the mobile station 45 in the same time frame and any burst received by the relay station 55 from the mobile station 45 can be transmitted to the base station 15 in the same time frame. This represents a frame structure with a frame relevance 0 implementation. The physical layer (PHY) and MAC configuration of the relay station determine whether the relay station can support such a frame relevance 0 implementation.

Various embodiments of the present invention provide for the first and third allocated time zones of the downlink sub-frame and the first and second allocated time zones of the uplink sub-frame to be subject to a dedicated allocation, for example, partially used sub-carriers (PUSC). Furthermore, various embodiments of the present invention provide for the second allocated time zone of the downlink sub-frame and the third allocated time zone of the uplink sub-frame to be subject to optional allocations. The various embodiments of the present invention are not limited to a frame structure where the first and third allocated time zones of the downlink sub-frame and the first and second allocated time zones of the uplink sub-frame are subject to a dedicated allocation and the second allocated time zone of the downlink sub-frame and the third allocated time zone of the uplink sub-frame are subject to optional allocations, but may include any frame structure with any allocation type.

Each OFDMA frame is started with a preamble burst 102 and 202, respectively, and an allocation burst 104 and 204, respectively. Allocation bursts 104 and 204 may be, for example, Mobile Application Part (MAP) bursts. Successive preamble bursts 102 and allocation bursts 104 delimit single, individual time frames for the base station. Successive preamble bursts 202 and allocation bursts 204 delimit single, individual time frames for the relay station. The preamble burst 102 and allocation burst 104 for the base station frame are provided prior to the first allocated time zone of the downlink sub-frame, as is conventional in networks operating under the Institute of Electrical and Electronics Engineers (IEEE) 802.16e standard. However, the preamble burst 202 and allocation burst 204 for the relay station frame are provided prior to the third allocated time zone of the downlink sub-frame. As such, the relay station frame, as shown in FIG. 3, has an asymmetrical downlink/uplink structure when compared to the base station frame, as shown in FIG. 2.

Thus, there are typically no concurrent transmit/receive operations at the relay station level and transmit/receive activity can be synchronized between the base station and the relay station such that intra-cell interference is avoided. Therefore, a relay station having a shared (switched) transceiver can be allowed, providing for significant cost reduction. Furthermore, the relay station can be made capable of maintaining back ward compatibility with hardware operating under the IEEE 802.16e standard.

FIGS. 2-3 are only illustrative of frame structures and traffic activity for a base station and a relay station in a network having single relay station, a single base station, and three mobile stations operating in an OFDMA network. The various embodiments of the present invention are not limited to an OFDMA network including only a single relay station, a single base station, and three mobile stations, but may include any wireless communication network supporting any number of base stations, relay stations, and mobile stations.

Where multiple relay stations are operating within a cell of an OFDMA network, the first allocated time zone of the downlink sub-frame can be scheduled for downlink transmissions dedicated to all of the intra-cell relay stations and the first allocation is Partially Used Sub-carriers (PUSC). A second allocation may be defined. The various embodiments of the present invention are not limited to these allocations, but may include any allocation structure.

The third allocated time zone of the downlink sub-frame and the third allocated time zone of the uplink sub-frame can be used by all the relay stations, subject to proper network management, targeting optimized intra-cell interference management. The first allocation is PUSC and a subsequent allocation could be defined. The various embodiments of the present invention are not limited to these allocations, but may include any allocation structure.

The first allocated time zone of the uplink sub-frame can be used by all intra-cell relay stations subject to the same allocation usage. The first allocation is PUSC and a subsequent allocation could be defined. The various embodiments of the present invention are not limited to these allocations, but may include any allocation structure.

Figure 4:
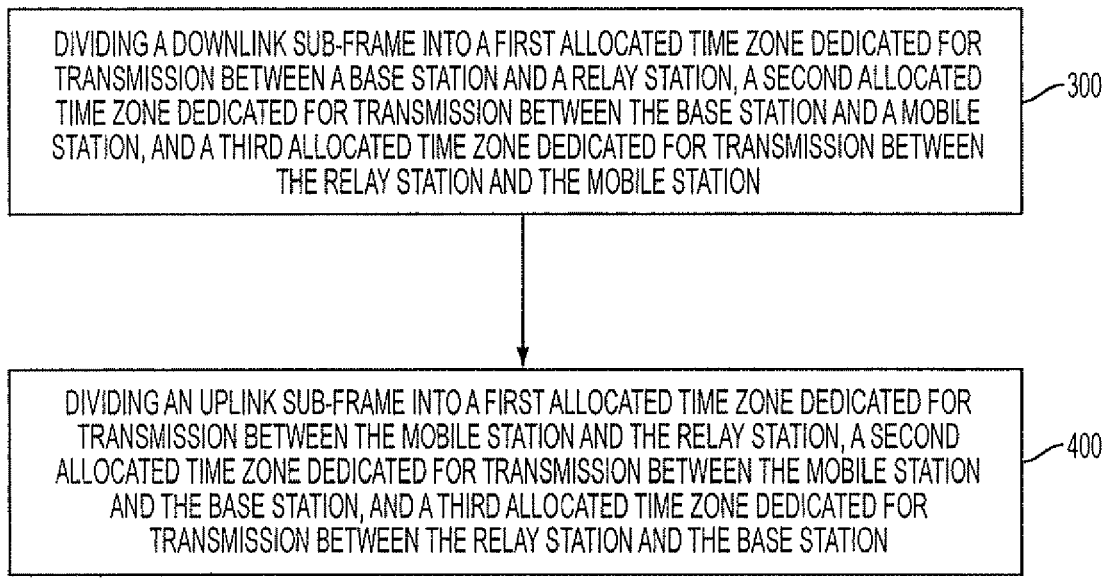
FIG. 4 is a flowchart illustrating the method of structuring a time frame for a relay station operating in a mobile Orthogonal Frequency Division Multiple Access (OFDMA) network having a base station and one or more mobile stations, according to an embodiment of the present invention.

FIG. 4 is a flowchart illustrating a procedure of structuring a time frame for a relay station operating in a mobile Orthogonal Frequency Division Multiple Access (OFDMA) network. Referring now to FIG. 4, in operation 300, a downlink sub-frame of the time frame is divided into a first allocated time zone dedicated for transmission between the base station and relay station, a second allocated time zone dedicated for transmission between the base station and the one or more mobile stations, and a third allocated time zone dedicated for transmission between the relay station and the one or more mobile stations.

From operation 300, the process moves to operation 400, where an uplink sub-frame of the time frame is divided into a first allocated time zone dedicated for transmission between the one or more mobile stations and the relay station, a second allocated time zone dedicated for transmission between the one or more mobile stations and the base station, and a third allocated time zone dedicated for transmission between the relay station and the base station.

The process may further provide a preamble burst and an allocation burst (MAP burst) at the beginning of the third allocated time zone of the downlink sub-frame. By providing the preamble burst and the allocation burst at the beginning of the third allocated time zone of the downlink sub-frame, there are no concurrent transmit/receive operations at the relay station level and transmit/receive activity is synchronized between the base station and the relay station such that intra-cell interference is avoided.

The present invention relates to frame structures for relay stations acting in OFDMA networks, and in particular, 802.16 networks. However, the present invention is not limited to any specific types of networks, and the frame structure and method of the relay station could be applied in various different types of wireless communications networks. Furthermore, it is desirable for a relay station to be backwards compatible with all base stations and mobile stations operating in such a network, for example in WiMAX networks based on the IEEE 802.16e standard.

The relay station may be subject to significant interference between these concurrent transceiver operations. The concurrent transmission of the transmitter of the relay station and the receiver of the relay station may lead to a severe degradation of any received signal by the relay station during that particular time frame. Furthermore, a relay station transmitting concurrently with a related anchor base station would cause a severe degradation of any signal received by a mobile station or another relay station located within the overlapping service area. There is also a disadvantage in that it is expensive to provide such a double transceiver relay station. Thus, it is also desirable for a switched-transceiver architecture of a relay station to be supported by the frame structure.

The present invention relates to the IEEE 802.16 standard, which includes its amendments and extensions, such as, for example, IEEE 802.16e and IEEE 802.16j. The IEEE 802.16 standard is incorporated herein by reference in its entirety.

application Ser. No. 11/691,785, titled SWITCHABLE TRANSCEIVER FOR RELAY STATION, inventors Aram Sukiasyan, Chad Gilbertson, and Dorin Viorel, filed on Mar. 27, 2007, is incorporated herein by reference in its entirety.

Although a few preferred embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of structuring a time frame for a relay station operating in a mobile Orthogonal Frequency Division Multiple Access (OFDMA) network, comprising:
    dividing a downlink sub-frame of the time frame into a first allocated time zone dedicated for transmission between a base station in the network and the relay station, a second allocated time zone dedicated for transmission between the base station and a mobile station in the network, and a third allocated time zone dedicated for transmission between the relay station and the mobile station;
    dividing an uplink sub-frame of the time frame into a first allocated time zone dedicated for transmission between the mobile station and the relay station, a second allocated time zone dedicated for transmission between the mobile station and the base station, and a third allocated time zone dedicated for transmission between the relay station and the base station; and
    selectively transmitting and/or receiving signals, by the relay station, during the first and third allocated time zones of the downlink sub-frame and the first and third allocated time zones of the uplink sub-frame.

2. The method of claim 1, further comprising providing a preamble burst and an allocation burst at the beginning of the third allocated time zone of the downlink sub-frame.

3. The method of claim 2, wherein a single time frame is delimited by successive preamble bursts.

4. The method of claim 3, wherein the frame structure has a frame relevance of 1.

5. The method of claim 3, wherein the frame structure has a frame relevance of 0.

6. The method of claim 1, wherein the first and third allocated time zones of the downlink sub-frame and the first and second allocated time zones of the uplink sub-frame are subject to a dedicated allocation.

7. The method of claim 6, wherein the second allocated time zone of the downlink sub-frame and the third allocated time zone of the uplink sub-frame are subject to optional allocations.

8. The method of claim 7, wherein the dedicated allocation is partially used sub-carriers (PUSC).

9. The method of claim 1, wherein multiple relay stations within the same network cell share the first and third allocated time zones of the downlink sub-frame and the first and third allocated time zones of the uplink sub-frame.

10. The method of claim 1, wherein the OFDMA network is a network under Institute of Electrical and Electronics Engineers (IEEE) 802.16.

* * * * *